(12) United States Patent
Keskikangas et al.

(10) Patent No.: US 11,539,909 B2
(45) Date of Patent: Dec. 27, 2022

(54) CONTROLLING A PAN-TILT-ZOOM CAMERA

(71) Applicant: Axis AB, Lund (SE)

(72) Inventors: Axel Keskikangas, Lund (SE); Song Yuan, Lund (SE); John Rehn, Lund (SE)

(73) Assignee: AXIS AB, Lund (SE)

( * ) Notice: Subject to any disclaimer, the term of this patent is extended or adjusted under 35 U.S.C. 154(b) by 21 days.

(21) Appl. No.: 17/301,102

(22) Filed: Mar. 25, 2021

(65) Prior Publication Data

US 2021/0337158 A1 Oct. 28, 2021

(30) Foreign Application Priority Data

Apr. 23, 2020 (EP) ..................................... 20171067

(51) Int. Cl.
| | | |
|---|---|---|
| *H04N 5/45* | (2011.01) | |
| *H04N 19/159* | (2014.01) | |
| *H04N 19/16* | (2014.01) | |
| *H04N 19/177* | (2014.01) | |
| *H04N 5/232* | (2006.01) | |
| *H04N 5/262* | (2006.01) | |
| *H04N 5/272* | (2006.01) | |
| *H04N 7/01* | (2006.01) | |

(52) U.S. Cl.
CPC ........... *H04N 5/45* (2013.01); *H04N 5/23203* (2013.01); *H04N 5/23229* (2013.01); *H04N 5/23296* (2013.01); *H04N 5/23299* (2018.08); *H04N 5/2628* (2013.01); *H04N 5/272* (2013.01); *H04N 7/013* (2013.01); *H04N 19/159* (2014.11); *H04N 19/16* (2014.11); *H04N 19/177* (2014.11)

(58) Field of Classification Search
CPC .. H04N 5/45; H04N 5/23203; H04N 5/23229; H04N 5/23296; H04N 5/23299; H04N 5/2628; H04N 5/272; H04N 7/013; H04N 19/159; H04N 19/16; H04N 19/177; H04N 5/23206; H04N 5/23216; H04N 5/23218; H04N 5/23232; H04N 5/262
See application file for complete search history.

(56) References Cited

U.S. PATENT DOCUMENTS

| | | | | |
|---|---|---|---|---|
| 7,543,327 | B1 * | 6/2009 | Kaplinsky | ........ G08B 13/19691 348/207.1 |
| 2002/0135677 | A1 | 9/2002 | Noro et al. | |
| 2004/0223058 | A1 * | 11/2004 | Richter | .............. H04N 21/2383 348/207.1 |

(Continued)

FOREIGN PATENT DOCUMENTS

EP 3474225 A1 4/2019

*Primary Examiner* — Chiawei Chen
(74) *Attorney, Agent, or Firm* — Volpe Koenig

(57) ABSTRACT

Methods and apparatus, including computer program products, for controlling a Pan-Tilt-Zoom (PTZ) camera. A video stream is provided by the PTZ camera. The video stream includes a main image and a smaller picture-in-picture overlay. The main image and the overlay show the same view. The overlay has both a higher frame rate and a lower resolution compared to the main image. A movement control instruction is received, by the PTZ camera, in response to an evaluation of at least one of the main image and the overlay.

10 Claims, 3 Drawing Sheets

(56) References Cited

U.S. PATENT DOCUMENTS

| | | | | |
|---|---|---|---|---|
| 2007/0041451 | A1* | 2/2007 | Kondo | H04N 19/61 |
| | | | | 375/E7.199 |
| 2007/0250896 | A1* | 10/2007 | Parker | H04N 7/163 |
| | | | | 725/135 |
| 2008/0129844 | A1 | 6/2008 | Cusack et al. | |
| 2009/0249393 | A1* | 10/2009 | Shelton | H04N 21/43074 |
| | | | | 375/E7.076 |
| 2010/0066836 | A1 | 3/2010 | Nakamura et al. | |
| 2011/0249074 | A1* | 10/2011 | Cranfill | H04N 5/272 |
| | | | | 348/E7.083 |
| 2015/0373328 | A1* | 12/2015 | Yenneti | H04N 19/31 |
| | | | | 375/240.03 |
| 2019/0373173 | A1* | 12/2019 | Wang | G03B 15/006 |

* cited by examiner

| Time | T0 | T1 | T2 | T3 | T4 | T5 | T6 |
|---|---|---|---|---|---|---|---|
| Main image | I-frame | 0-delta | 0-delta | P-frame | 0-delta | 0-delta | P-frame |
| Overlay | | P-frame | P-frame | | P-frame | P-frame | |

FIG. 4

CONTROLLING A PAN-TILT-ZOOM CAMERA

BACKGROUND

The present invention relates to cameras, and more specifically to controlling a Pan-Tilt-Zoom (PTZ) camera in a bandwidth-restricted environment.

A PTZ camera is a network camera that is capable of remote directional and zoom control by a user, and can therefore provide both wide-area coverage and great detail. PTZ cameras are commonly used in applications such as surveillance, video conferencing, live production, lecture capture and distance learning. Most of the time, PTZ cameras have a wired connection to a computer network, such as an intranet or the Internet, but there are also situations when temporary camera installations are used and the PTZ camera connects wirelessly to the network. Some examples of such situations may include sporting events, and various types of music or food festivals, and the like.

When using a wireless setup, the signal from the camera my bounce a number of times between wireless transmitters and receivers, before eventually finding its way to a wired connection, such as a fiber. This repeated bouncing causes both jitter and delay to be introduced into the video stream transmitted by the camera. As a result, a user controlling the camera remotely may experience both a picture having degraded quality and a delay in the camera performing the actions initiated by the user, neither of which is ideal in a situation where the user is trying to zoom in on specific features in a larger image or trying to track moving persons or objects within the video recorded by the camera. It should be noted that while these problems may be more common in wireless networks, similar issues may also occur in wired networks.

Attempts have been made to mitigate these problems by reducing the bandwidth needed by the camera. The bandwidth reduction can be accomplished in two main ways: either by keeping a high resolution video and lowering the frame rate, or by lowering the resolution and keeping a high frame rate. In the first approach, a user gets a clear overview image to look at, but will find the camera more difficult to control, which could be an issue when the user tracks people or objects in the video. In the second approach, the user experiences the camera as being more responsive, but the lower resolution may make it more difficult for the user to identify people or objects in the image. Thus, each approach comes with its own drawbacks, and it would be desirable to find better ways to achieve interactive PTZ camera control in a bandwidth-restricted environment, while retaining a high-resolution image.

SUMMARY

According to a first aspect, the invention relates to a method, in a computer system, for controlling a Pan-Tilt-Zoom (PTZ) camera. The method includes:
  providing, by the PTZ camera, a video stream comprising a main image and a smaller picture-in-picture overlay, wherein the main image and the overlay show the same view and wherein the overlay has both a higher frame rate and a lower resolution compared to the main image; and
  receiving, by the PTZ camera, a movement control instruction in response to an evaluation of at least one of the main image and the overlay.

This provides a camera user with two alternative images showing the same view, and enables the user to make a decision about which image to use for the particular situation at hand. For example, the user may look at the larger, higher resolution, image to identify persons or objects of interest. If the person or object starts moving, the camera user can turn her attention to the overlay image, which has a higher frame rate, and can use this image to aid in controlling the movements of the camera when tracking the person or object. When the person or object subsequently stops, the user can bring her attention back to the main image for a more high-resolution view of the person or object of interest. This facilitates the control of the camera by the user, and improves the user experience. At the same time as the user interactivity is improved, significant bandwidth use by the camera is also saved. For example, in one implementation, the overlay may be a 60 FPS, 360p video stream, and the main image may be a 6 FPS, 4 k video stream. When comparing the bandwidth needed for these two video streams with the bandwidth that would be needed for a 60 FPS, 4 k video stream, it is clear that a significant reduction in bitrate can be achieved.

According to one embodiment, the overlay is displayed in response to a movement event being triggered for the PTZ camera by a user. That is, when the camera is not being moved, the overlay is not displayed, but as soon as the camera receives an instruction from the camera user to start a pan/tilt/zoom operation, the overlay is displayed. This saves further bandwidth during the times when the camera is stationary, and also allows the user a completely unobstructed view of the main image during these times.

According to one embodiment, the size and the position of the overlay within the main image is configurable by a user. This allows the user to configure the overlay so that it does not block certain areas of the main image that the user may consider to be of particular interest. Further, when controlling the camera, some users may find it helpful to have a larger overlay, as they may not be as interested in the main image when the camera is tracking a person or object. Thus having an overlay with configurable size and position provides further flexibility for the user.

According to one embodiment the overlay is added to the main image by a video post processing (VPP) component prior to encoding the video stream. By adding the overlay prior to encoding the video, the encoder is presented with a video stream in which the individual frames already include the main image and the overlay, respectively. The encoder can thereby proceed with conventional encoding of the video stream, and does not need to be modified to take into account the possible existence of an overlay. However, it should be noted that there are embodiments in which the encoder can be provided with additional information, which may further aid the encoding process. Such embodiments will be discussed in further detail below, in the detailed description section of this document.

According to one embodiment, providing a video stream may comprise: receiving image data captured by the PTZ camera, using the received image data as image data of a main image, scaling down the received image data to create an overlay picture having a desired size and resolution, positioning the first overlay picture onto the main image, and encoding the main image and overlay picture as a series of intra-frame and inter-frame pictures to create the video stream. Many of these operations are "conventional" operations within the realm of image encoding, thereby making it easier to implement the invention in existing systems.

According to one embodiment, encoding the main image and overlay may comprise: encoding the main image at a first frame rate as an intra-frame, followed by a series of inter-frames, until a group of pictures length has been reached, and encoding the overlay at a second, faster, frame rate as a series of inter-frames, referencing the most recent intra-frame or inter-frame for the main image, until a group of pictures length has been reached. Intra- and inter-frame encoding are well known techniques that are familiar to those having ordinary skill in the art. By encoding the overlay, which has a faster frame rate, as inter-frames referencing the most recent intra-frame or inter-frame for the main image, significant bandwidth can be saved as only "differences" between a current frame and a previous frame are encoded.

According to one embodiment, the first intra-frame is encoded as a no-display image. As will be described below in the detailed description, the image data of the first intra-frame is the original image data captured by the camera (i.e., without overlay). By including this data in the encoded video stream as a no-display image, and the overlay image as a P-frame with the same display time, one can at a first instance view the video with the overlay image as described above in this invention. At a later time, the overlay P-frames can be pruned and the no-display flag on the intra-frame can be flipped to be able to remove the overlay image when viewing recorded video. This requires a custom decoder or a custom video player in order to process the video. Thus, using this type of encoding, it is possible to create a video stream that can be decoded in a "conventional" client, but which can also be decoded by a custom client to remove the overlay and to only show the original image. This can be done both live and during playback at a later point in time, e.g., for forensic purposes.

According to one embodiment the frame rate for the overlay is approximately ten times the frame rate of the main image. This allows a smooth view when moving the camera, and at the same time sufficiently frequent updates of the main image. For example, the overlay may be updated at a rate of 60 FPS and the main image may be updated at a rate of 6 FPS. With this setup, if the operator is looking at the main image, the operator would notice a change occurring in the scene within $\frac{1}{6}^{th}$ of a second. If the camera operator looks at the overlay image, the corresponding time would only be $\frac{1}{60}^{th}$ of a second. These types of "reaction times" are more than sufficient in most practical applications.

According to one embodiment, wherein the video is encoded in one of the following video encoding formats: High Efficiency Image File Format, Advanced Video Coding, H.264, H.265, H.266, VP9, VP10 and AV1. That is, the encoded video stream can be decoded by a standard video stream decoded that supports the video coding format used by the encoder, since the methods described herein follow the standards of such video coding formats, which increases the versatility of the invention.

According to a second aspect, the invention relates to a system for controlling a Pan-Tilt-Zoom (PTZ) camera. The memory contains instructions that when executed by the processor causes the processor to perform a method that includes:

providing, by the PTZ camera, a video stream comprising a main image and a smaller picture-in-picture overlay, wherein the main image and the overlay show the same view and wherein the overlay has both a higher frame rate and a lower resolution compared to the main image; and receiving, by the PTZ camera, a movement control instruction in response to an evaluation of at least one of the main image and the overlay.

The system advantages correspond to those of the method and may be varied similarly.

According to a third aspect, the invention relates to a computer program for controlling a Pan-Tilt-Zoom (PTZ) camera. The computer program contains instructions corresponding to the steps of:

providing, by the PTZ camera, a video stream comprising a main image and a smaller picture-in-picture overlay, wherein the main image and the overlay show the same view and wherein the overlay has both a higher frame rate and a lower resolution compared to the main image; and receiving, by the PTZ camera, a movement control instruction in response to an evaluation of at least one of the main image and the overlay.

The computer program involves advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

FIG. 4 is a table showing the encoding of a stream of image frames, in accordance with one embodiment.

Like reference symbols in the various drawings indicate like elements.

DETAILED DESCRIPTION

Overview

As was described above, one goal with the various embodiments of the invention is to provide improved techniques for achieving interactive PTZ camera control in a bandwidth-restricted environment (wireless, wired, or a combination thereof), while retaining a high-resolution image of the scene captured by the camera. In accordance with the various embodiments described herein, this is achieved by providing, by the camera, a video stream that has a main image and a smaller picture-in-picture overlay (hereinafter referred to as an "overlay"). The main image and the overlay show the same image (except that a portion of the main image is covered by the overlay), but with different resolutions and frame rates. In particular, the overlay has a higher frame rate and a lower resolution compared to the main image. This allows the overlay to update more frequently, compared to the main image, and thus provides a camera operator with better control of the camera, as the operator can refer to the overlay while the camera is in motion and to the main high-resolution image once the camera stops moving. In addition, by updating the main, high-resolution image less frequently, significant bandwidth savings can be achieved compared to conventional methods where a single high-resolution camera view is updated frequently. Various embodiments of the invention will now be described by way of example and with reference to the drawings.

System Overview

Figure 1:
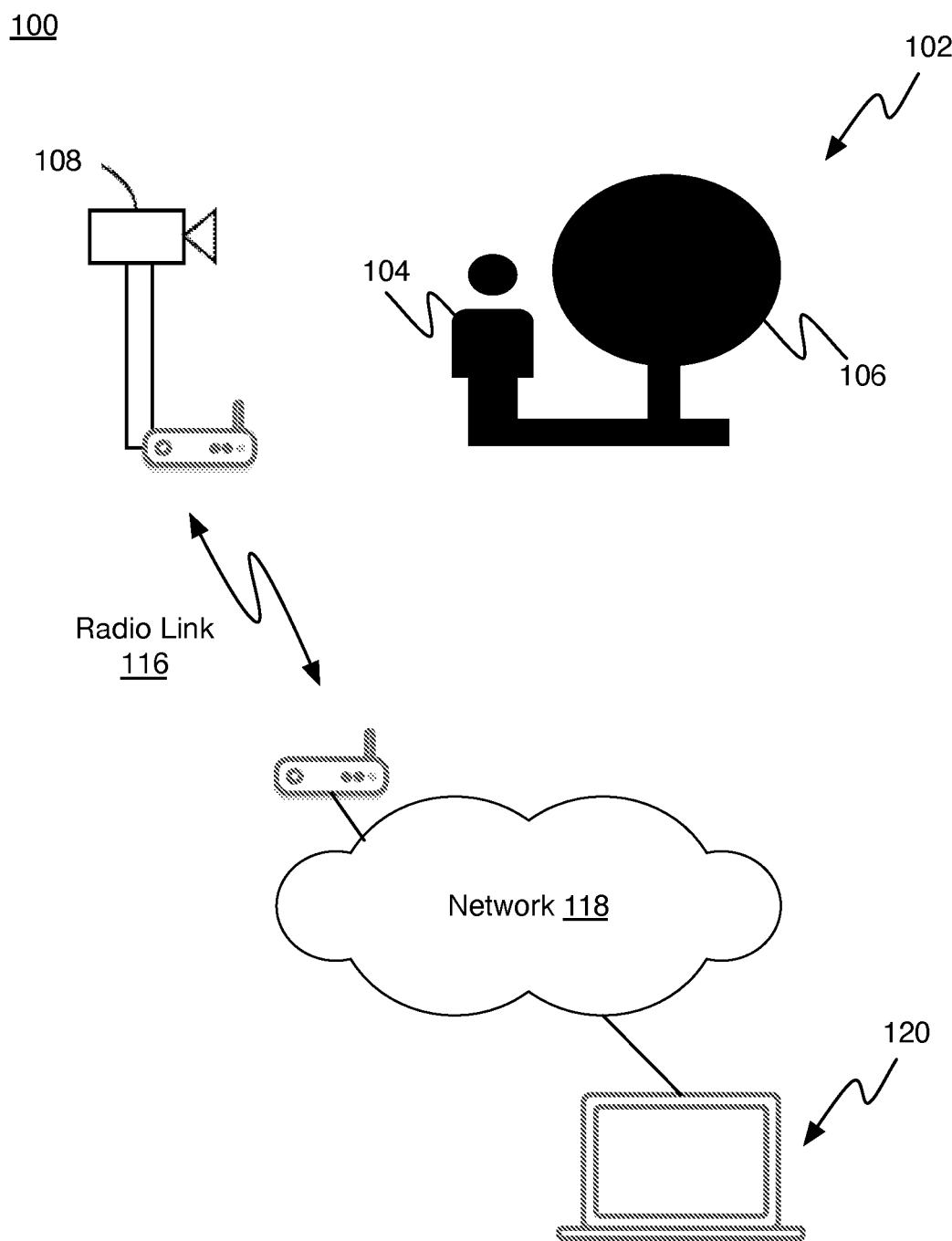
FIG. 1 is a schematic diagram showing a system for controlling a PTZ camera, in accordance with one embodiment.

FIG. 1 shows a schematic diagram of a system 100 in accordance with one embodiment of the invention. As can be seen in FIG. 1, a scene 102 with a person 104 and a tree 106 is captured by a video camera 108. It should be noted that this depiction of a scene 102 is merely a simplistic view for illustrative purposes. A scene 102 can be described, in a more general sense as any three-dimensional physical space whose size and shape is defined by the field of vision of a camera recording the scene. Often a scene 102, for example at a music festival or the like, includes a number of individuals and objects.

Figure 3:
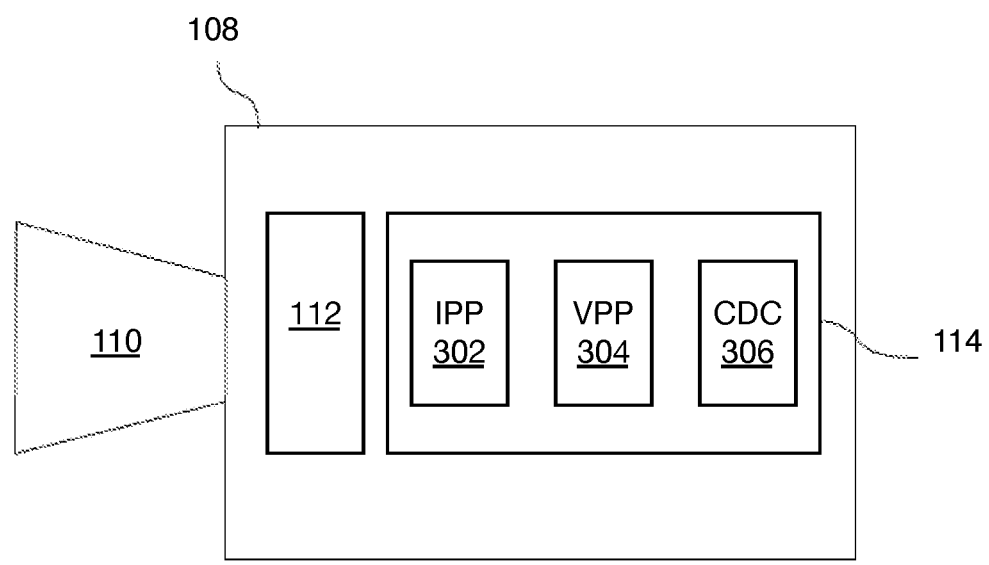
FIG. 3 is a block diagram showing selected components of a PTZ camera that are used in capturing and processing images, in accordance with one embodiment.

The camera 108, which is illustrated in more detail in FIG. 3, has a lens 110 which captures the scene 102 and projects it onto an image sensor 112. The image sensor 112 captures a series of images, which together form a video stream. The image sensor is coupled to an image processing and encoding unit 114, which will be described in further detail below. The image processing and encoding unit 114 is preferably located inside the camera 108, but could also be external to the camera. The image processing and encoding unit 114 takes the signal from the image sensor 112 and performs various types of image processing operations, such as scaling, adding the overlay, etc., before finally encoding the video stream into a format that is suitable for transmission over a network to a user. In FIG. 1, the encoded video is transmitted wirelessly over a radio link 116 to a wired network 118, and eventually to a client 120, which is connected to the network 118.

The client 120 has a display screen where a user can view the image video stream from the camera. Typically, the client 120 is also used to control the camera 108, for example, by the user issuing PTZ control commands at the client 120. For example, a user may instruct the camera to zoom in on a particular detail of the scene 102, or to track the person 104 if she starts to move away from the tree 106.

Client Display and User Experience

Figure 2:
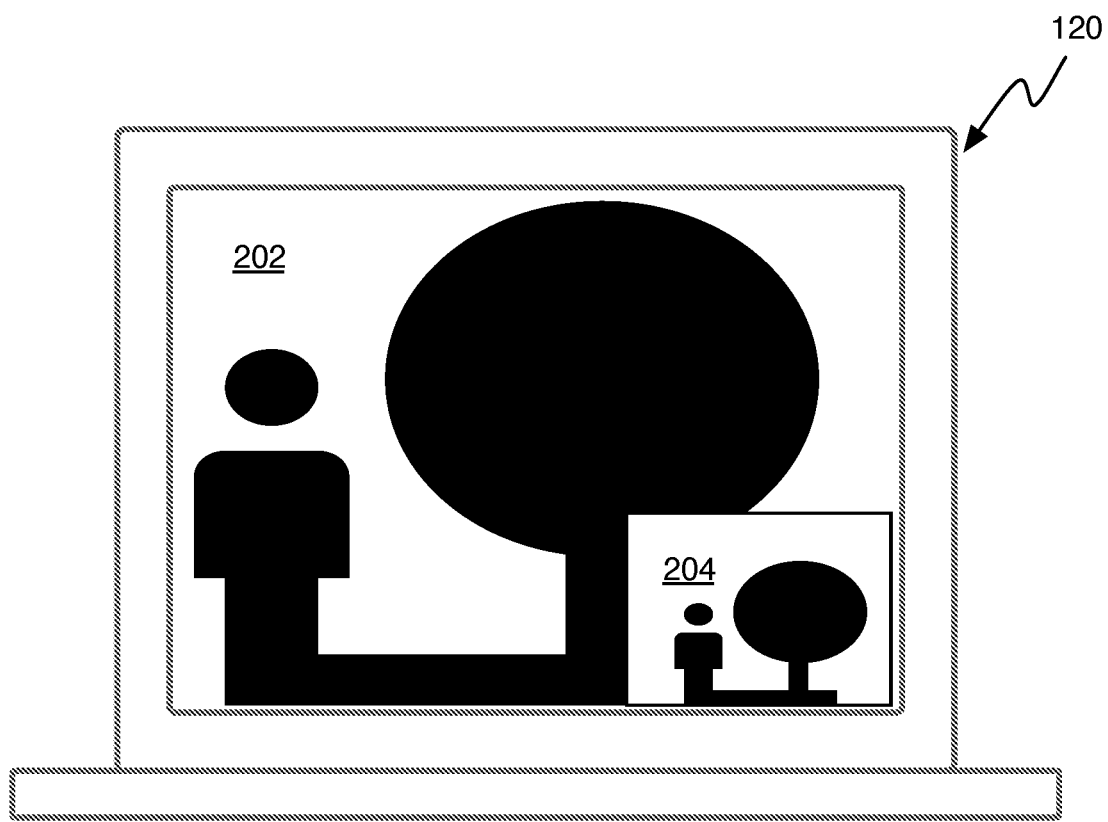
FIG. 2 is a schematic view of a display on a client device, showing a main image and an image overlay, in accordance with one embodiment.

FIG. 2 shows a schematic view in accordance with one invention of what a user may see on the display of her client 120. As can be seen in FIG. 2, the display includes a main image 202 and an overlay 204. As noted above, the main image 202 and the overlay 204 show the same video stream captured by the camera 108, but with different sizes, resolutions, and frame rates. For example, in one embodiment the main image 202 may be a 4 k video stream at 6 FPS, and the overlay 204 may be a 360p video stream at 60 FPS. As the overlay 204 has a higher frame rate, it updates more rapidly and thus appears to the user as being more "responsive" when the user issues a control command for the camera 108, compared to the main image 202 which is updated at a lower frame rate. However, due to the higher resolution of the main image 202, the user will be able to distinguish more detail in the main image 202 compared to the overlay 204. In some systems, an overlay is also referred to as an "On Screen Display" (OSD). Another alternative expression is "Picture-in-Picture" (PIP), which is typically used only when the overlay displays video content.

It should be noted that since the overlay 204 covers part of the main image 202, the overlay 204 and main image 202 are not exactly identical, but rather the overlay 204 shows what the main image 202 would have looked like, had the overlay 204 not been there. However, for purposes of explanation herein, the main image 202 and overlay 204 will be referred to as being identical.

It should further be noted that in some embodiments, the overlay 204 is not shown until a user issues a control command for the camera 108. Thereby, the user will have an unobstructed view of the main image 202. Assuming the previously mentioned frame rates with the main image 202 updating at 6 FPS, this also means that there would be a maximum "delay" of ⅙ of a second before a user would discover and take action on an event occurring in the scene that would require the camera 108 to be controlled, if the user's focus is on the main image, and ¹⁄₆₀ second if the user's focus is on the overlay, as was described above. Such a delay is generally deemed to be acceptable in most practical situations.

In some embodiments, the position and size of the overlay 204 on the main image 202 can be configurable by the user. Thus, while the overlay 204 is illustrated in FIG. 2 as being in the lower right corner of the main image 202, the overlay 204 can be placed essentially anywhere on the main image 202. This can be useful, for example, if there are details in the lower right corner (or some other part) of the main image 202 that may be of particular interest and that should not be blocked by the overlay 204. In such a situation, the user may want to change position of the overlay 204 to a different part of the main image 202. Further, in some situations, a user may prefer a different size of the overlay 204, for example, if a large part of the lower right corner of the main image 202 is of little interest to the user, the user may choose to display an overlay 204 having a larger size than the "standard" size. In some implementations, the overlay may also have a different shape compared to the conventional rectangular shape. For example, there may be an oval or a circular overlay into which the image is projected, for example, to make it appear as if you were looking through a concave or convex lens, or some kind of "fisheye" lens or the like. The only prerequisite or "outer limits" for the size and shape of the overlay is that it is smaller than the main image. The overlay can be based on macroblocks. Thus, many variations can be envisioned by those having ordinary skill in the art.

Camera Components and Video Encoding

As was mentioned above, the camera 108 includes a lens 110, an image sensor 112 and an image processing and encoding unit 114, which receives raw data from the image sensor 112. FIG. 3 shows a more detailed diagram of the main components of the image processing and encoding unit 114. As can be seen in FIG. 3, the image processing and encoding unit 114 includes an Image Post Processing (IPP) component 302, a video post processing (VPP) component 304, and a coding and decoding (CDC) component 306.

The IPP 302 receives sensor data from the image sensor 112, which is typically in the order of several Gigabytes, and produces an image in raw format that is recognizable by a human and has a size of typically 100 Megabytes or so. The image is sent to the VPP 304, which performs downscaling of the image and adds the downscaled image as an overlay to the image, and merges the two. That is, the VPP 304 is where the main image 202 with the overlay 204 is created, which will subsequently be encoded and transmitted to the client 120 and shown on the display 200. The "final image" that comes out of the VPP 304 has a size of just a few Megabytes. The downscaling of the image to form the image that is used for the overlay 204 can be performed using any known image scaling algorithm, such as Nearest-neighbor, interpolation, Bilinear and bicubic algorithms, Box sampling, etc., as is well known to those having ordinary skill in the art. The placement of the downscaled image as an overlay 204 on the main image 202 can also be done using any among a number of well-known techniques, such as determining a location for the overlay and replacing the pixel data of the main image with pixel data of the overlay in that location, just to mention one technique.

The "final image" resulting from the processing in the VPP 304 is then transmitted to the CDC 306 for encoding into a format suitable for transmission to the client 120. The operation of the CDC 306 will be described in detail below. However, in order to facilitate that description, a brief overview of video encoding and associated concepts will first be presented.

There are a number of conventional video encoding formats. Some common video encoding formats that work with the various embodiments of the present invention include: High Efficiency Image File Format, Advanced Video Coding, H.264, H.265, H.266, VP9, VP10 and AV1. These video encoding formats prescribe temporal video compression implemented in terms of intra frames, also referred to as "I-frames," and inter-frames, also referred to as "P-frames" or "B-frames." An I-frame can be described an image frame that is encoded using only the information in the image frame to be encoded. Moreover, the I-frame is calculated from all image data captured for the image frame to be encoded. Therefore, the I-frame sometimes is also referred to as a full frame.

The inter-frames, also referred to as predictive frames or differential frames, are based on information from previously (and optionally later) encoded image frames as well as the information of the presently encoded frame. That is, an inter-frame may be described as taking advantage of temporally redundant information in previous (and optionally later) image frames. An encoder implementing this type of codecs (compression standards) typically generates an I-frame followed by a predetermined number of inter-frames, and then a new I-frame followed by the same number of inter-frames. The length of this sequence of an I-frame followed by a number of inter-frames is often referred to as a Group of Pictures (GOP) length. For some compression standards, such as H.265, the GOP-length can be adjusted during encoding.

In accordance with one embodiment, the input to the VPP 304 is controlled, such that a stream of overlay images is provided at the frame rate that is required for the overlay, and the high resolution images are only provided rarely, at the lower frame rate. After processing by the VPP 304, the images output from the VPP 304 (i.e., the combined main image and overlay) are encoded by the CDC 306. This encoding can occur in a number of different ways. For illustration purposes, a few different embodiments will be presented here, although it should be realized that these are merely examples and that different encoding methods are also available that fall within the scope of the appended claims.

In a first embodiment, the CDC 306 receives a series of images representing the combined main image and overlay from the VPP 304 and performs "conventional" encoding of these images, just like any regular image stream would be encoded in accordance with one of the conventional encoding standards (e.g., High Efficiency Image File Format, Advanced Video Coding, H.264, H.265, H.266, VP9, VP10 and AV1, as described above). These types of encoders are commercially available and their operation is well known to those having ordinary skill in the art, and will therefore not be described here in any further detail.

In a second embodiment, the image stream from the VPP 304 is encoded by the CDC 306 as an I-frame, followed by several P-frames, as described above. The frame rate is the overlay frame rate, and since only the overlay is updated at this rate, the P-frames, except for the overlay area, can be encoded as empty blocks (also referred to as "skip blocks") by the CDC 306, that is, a block that should be an exact copy of a block in the identical position in a previous I- or P-frame. By using empty blocks, which refer back to a previous P- or I-frame, it is possible to save significant bandwidth. When it is time to update the main image again (i.e., at the slower frame rate), a new P-frame or I-frame for the main image is generated, again followed by a number of P-frames corresponding to the faster overlay frame rate, and so on. The CDC 306 can be instructed by the VPP 304 to code the parts of the P-frames that correspond to the main image as skip blocks.

A third embodiment uses a coding technique referred to as "hierarchical P-frame encoding." FIG. 4 shows an example of such a hierarchical P-frame encoding scheme for the CDC 306, in accordance with one embodiment. In FIG. 4, it is assumed that the overlay images has a frame rate that is three times the frame rate of the high resolution images. The CDC 306 encodes the images as follows: At time T0, the main image with the overlay is encoded as an I-frame. At times T1 and T2, respectively, the overlay image only is encoded as a P-frame, relative to the I-frame at time T0. The main image does not need to be updated at times T1 and T2, respectively, so the same main image is provided, which is indicated in the table as "0-delta." At time T3, the main image and overlay are encoded as a P-frame, with reference to the I-frame encoded at time T0. At times T4 and T5, respectively, only the overlay is encoded, similar to what was described with respect to times T1 and T2, the difference being that the encoding takes place with respect to the P-frame generated at time T3, rather than the I-frame generated at time T0. At time T6, a new P-frame is generated for the main image and overlay, similar to what occurred at time T3. The encoding process continues in this manner until the GOP-length has been reached. At that point in time, a new sequence of an I-frame followed by a number of P-frames may be started, as understood by the skilled person.

This "hierarchical P-frame encoding" is a well-known concept to those having ordinary skill in the art. One significant benefit resulting from such an encoding scheme is that the system becomes quite resistant to frame drops. Typically, if a P-frame is dropped, it would be necessary to wait until the next I-frame in order to be able to encode the video, which would appear as a "freeze" to a user watching the video. Here, in contrast, it would only be necessary to wait until the next P-frame, and the "freeze" would be much shorter, or even not noticeable, to the user. Another significant benefit of hierarchical P-frame encoding is that it enables pruning at the client that receives the video stream (assuming that the client has that capability). That is, the encoded video stream can be viewed at the client with or without the overlay. Further, this technique makes it possible to discard the overlay at the client, before saving the video to storage, in order to save storage space.

Concluding Comments

It should be noted that while the embodiments above have been described with respect to a set of exemplary video coding formats, any video coding format supporting encoding of a main image with an overlay, as described herein, is covered by the various embodiments, as claimed.

Further, while the above description is focused on using I-frames and P-frames, it should be noted that B-frames, which can refer both forwards and backwards in the GOP, can be used as an alternative to P-frames in accordance with the invention. B-frames may also result in increased bandwidth savings compared to P-frames. However, a drawback with using B-frames compared to P-frames is increased memory requirements, as it is necessary to wait for future frames before B-frames can be encoded.

The systems (e.g., encoder) and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

What is claimed is:

1. A method for controlling a Pan-Tilt-Zoom (PTZ) camera, comprising:
   providing, by the PTZ camera, a video stream comprising a main image and a smaller picture-in-picture overlay, wherein the main image and the overlay show the same view and wherein the overlay has both a higher frame rate and a lower resolution compared to the main image; and
   receiving, by the PTZ camera, a movement control instruction in response to an evaluation of at least one of the main image and the overlay;
   wherein providing the video stream comprises:
      receiving image data captured by the PTZ camera;
      using the received image data as image data of a main image;
      scaling down the received image data to create an overlay picture having a desired size and resolution;
      positioning the first overlay picture onto the main image; and
      encoding the main image and overlay picture as a series of intra-frame and inter-frame pictures to create the video stream.

2. The method of claim 1, wherein the overlay is displayed in response to a movement event being triggered for the PTZ camera by a user.

3. The method of claim 1, wherein the size and position of the overlay within the main image is configurable by a user.

4. The method of claim 1, wherein the overlay is added to the main image by a video post processing component prior to encoding the video stream.

5. The method of claim 1, wherein encoding the main image and overlay comprises:
   encoding the main image at a first frame rate as an intra-frame, followed by a series of inter-frames, until a group of pictures length has been reached; and
   encoding the overlay at a second, faster, frame rate as a series of inter-frames, referencing the most recent intra-frame or inter-frame for the main image, until a group of pictures length has been reached.

6. The method of claim 5, wherein the first intra-frame is encoded as a no-display image.

7. The method of claim 1, wherein the frame rate for the overlay is approximately ten times the frame rate of the main image.

8. The method of claim 1, wherein the video is encoded in one of the following video encoding formats: High Efficiency Image File Format, Advanced Video Coding, H.264, H.265, H.266, VP9, VP10 and AV1.

9. A system for controlling a Pan-Tilt-Zoom (PTZ) camera, comprising:
   a memory; and
   a processor,
   wherein the memory contains instructions that when executed by the processor causes the processor to perform a method that includes:
   providing, by the PTZ camera, a video stream comprising a main image and a smaller picture-in-picture overlay, wherein the main image and the overlay show the same view and wherein the overlay has both a higher frame rate and a lower resolution compared to the main image; and
   receiving, by the PTZ camera, a movement control instruction in response to an evaluation of at least one of the main image and the overlay;
   wherein providing the video stream comprises:
      receiving image data captured by the PTZ camera;
      using the received image data as image data of a main image;

scaling down the received image data to create an overlay picture having a desired size and resolution;

positioning the first overlay picture onto the main image; and encoding the main image and overlay picture as a series of intra-frame and inter-frame pictures to create the video stream.

10. A computer program product for controlling a Pan-Tilt-Zoom (PTZ) camera, comprising a computer readable storage medium having program instructions embodied therewith, wherein the computer readable storage medium is not a transitory signal per se, the program instructions being executable by a processor to perform a method comprising:

providing, by the PTZ camera, a video stream comprising a main image and a smaller picture-in-picture overlay, wherein the main image and the overlay show the same view and wherein the overlay has both a higher frame rate and a lower resolution compared to the main image; and receiving, by the PTZ camera, a movement control instruction in response to an evaluation of at least one of the main image and the overlay;

wherein providing the video stream comprises:

receiving image data captured by the PTZ camera;

using the received image data as image data of a main image;

scaling down the received image data to create an overlay picture having a desired size and resolution;

positioning the first overlay picture onto the main image; and encoding the main image and overlay picture as a series of intra-frame and inter-frame pictures to create the video stream.

\* \* \* \* \*